United States Patent [19]

Mayer et al.

[11] 4,347,121

[45] Aug. 31, 1982

[54] PRODUCTION OF LUBRICATING OILS

[75] Inventors: Jerome F. Mayer, San Anselmo; Stephen J. Miller, San Francisco; Dennis J. O'Rear, Tiburon, all of Calif.

[73] Assignee: Chevron Research Company, San Francisco, Calif.

[21] Appl. No.: 195,554

[22] Filed: Oct. 9, 1980

[51] Int. Cl.³ .................. C10G 11/05; C10G 45/12; C10G 49/08; C10G 69/04

[52] U.S. Cl. .................................... 208/58; 208/18; 208/59; 208/61

[58] Field of Search ............ 208/58, 59, 61, 18, 208/111

[56] References Cited

U.S. PATENT DOCUMENTS

| | | |
|---|---|---|
| 3,755,145 | 8/1973 | Orkin ............................ 208/111 |
| 3,876,522 | 4/1975 | Campbell et al. ............... 208/58 |
| 3,962,071 | 6/1976 | Itoh et al. ....................... 208/58 |
| 4,162,962 | 7/1979 | Stangeland et al. ............ 208/58 |
| 4,171,257 | 10/1979 | O'Rear et al. ................. 208/120 |
| 4,181,598 | 1/1980 | Gillespie et al. ............... 208/58 |
| 4,263,127 | 4/1981 | Rausch et al. ................. 208/58 |
| 4,283,271 | 8/1981 | Garwood et al. .............. 208/59 |
| 4,283,272 | 8/1981 | Garwood et al. .............. 208/59 |

*Primary Examiner*—Delbert E. Gantz
*Attorney, Agent, or Firm*—D. A. Newell; W. H. Hooper; W. L. Stumpf

[57] ABSTRACT

A process is provided for preparing stable lubricant oil stocks, comprising hydrocracking a hydrocarbonaceous feed to produce a hydrocrackate having a total nitrogen content of less than about 10 ppm by weight, followed by dewaxing and stabilizing the hydrocrackate.

12 Claims, 1 Drawing Figure

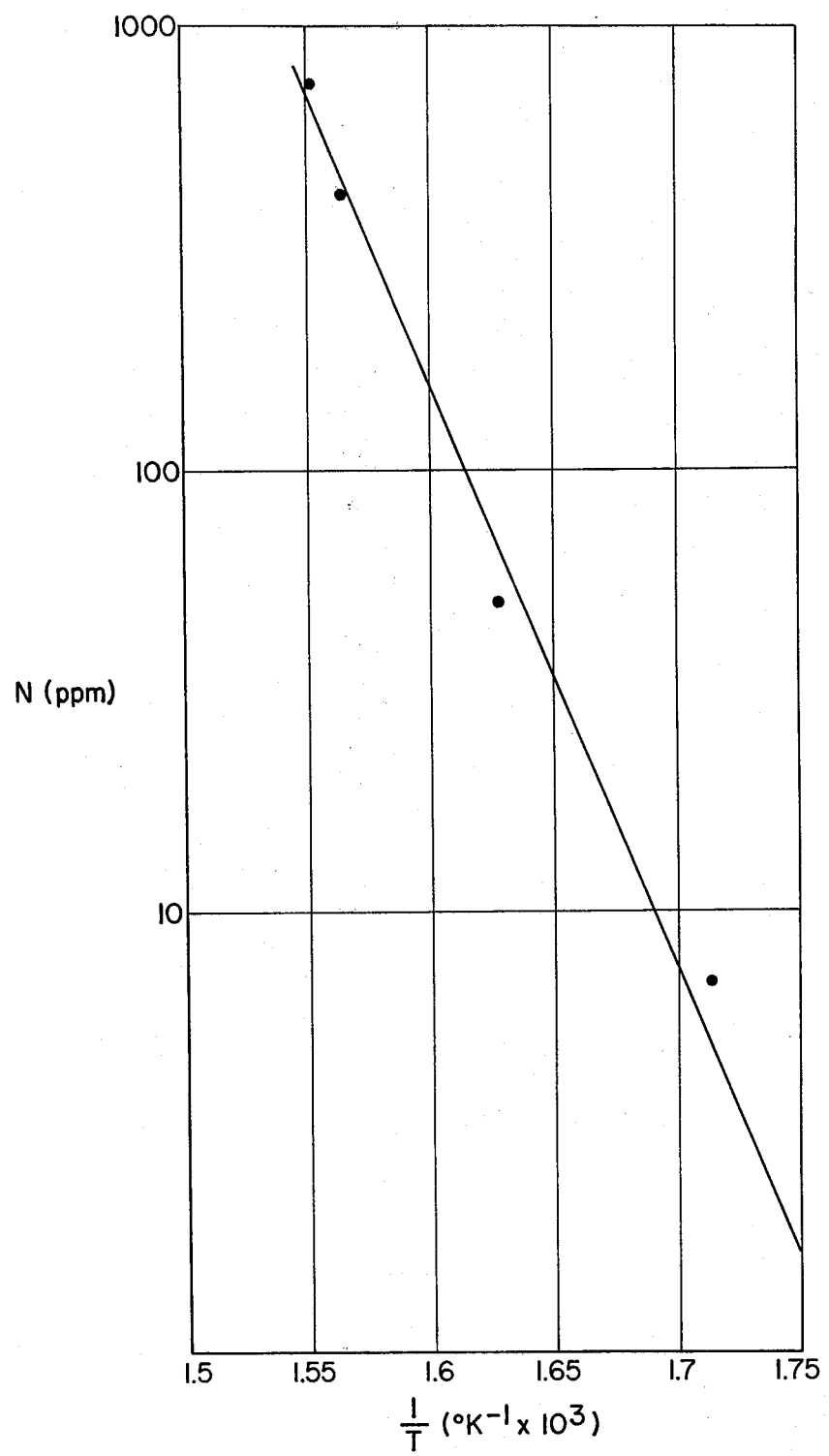

PRODUCTION OF LUBRICATING OILS

TECHNICAL FIELD

High-quality lubricating oils are critical for the machinery of modern society. Unfortunately, the supply of natural crude oils having good lubricating properties, e.g., Pennsylvania and Arabian Light feedstocks, is not enough to meet the demand. Additionally, because of uncertainties in world crude oil supplies, it is necessary to be able to produce high-quality lubricating oils efficiently from ordinary crude feedstocks.

Numerous processes have been proposed to produce lubricating oils from the ordinary and low-quality stocks which ordinarily would be converted into other products. For example, procedures using hydrocracking, solvent refining, and solvent dewaxing have been proposed. But process schemes which include solvent refining or dewaxing are inefficient. Hydrocracked lube oil stocks tend to be unstable in the presence of oxygen and light.

Other processing schemes have involved hydrocracking followed by hydrotreating (mild hydrogenation) of the hydrocrackate, and solvent dewaxing. The product is stable to sludge formation caused by photo-oxidation or air-oxidation, but a solvent processing step is still necessary. Although the products of such processing schemes can be stable, the schemes themselves are still inefficient because solvents are used. Separating extracted hydrocarbons from the solvent and purifying the solvent for reuse tends to be an annoying burden.

Still other process schemes involve the use of solvent extraction, to increase the viscosity index of the crude oil stock, followed by catalytic dewaxing. Catalytic dewaxing tends to be more efficient than solvent dewaxing since it selectively removes undesirable components from the feed while the product of the solvent extraction step is stable to oxygen and ultra-violet oxidation. However, a solvent is still required and it must still be reprocessed and separated from the extracted hydrocarbons.

It can be appreciated that there is a continuing intensive effort to develop efficient processes for producing high-quality lubricating oil stocks. The object of the present invention is to provide such a process.

We have discovered a synergistic combination of processing steps that produces high-quality lubricating oils from straight-run crude oils as well as from low-quality hydrocarbonaceous feeds. The first step is hydrocracking which increases the viscosity index of the feedstock by cracking and hydrogenating the aromatic compounds present in the feed. Hydrocracking also reduces the nitrogen content of the feed to a very low level. After the hydrocracking, a catalytic dewaxing step using an intermediate pore size, shape-selective aluminosilicate catalyst takes place. Combining the first, hydrocracking, step with the second, catalytic dewaxing step, makes the dewaxing process extremely efficient. The third step, which may occur either before or after the catalytic dewaxing step, is a hydrofinishing process which yields a lubricating oil stock stable to air and photolytic oxidation.

There are many advantages to the process. The viscosity index of the feed is increased without using solvents. The pour point of the stock is decreased without using solvents. The dewaxing process is extremely efficient when performed after hydrocracking since the activity of the dewaxing catalyst increases exponentially as the nitrogen level decreases. Further, the intermediate pore size dewaxing catalysts used are shape-selective and remove only the compounds which produce undesirably high pour point lubricating oil stocks—the normal and slightly branched paraffins. The treating step yields a stock which meets strict requirements for stability to air and photolytic oxidation. The final product is thus an air stable, light stable, low pour point, high viscosity index lubricating oil stock which has been produced by an energy-saving process.

Further, because solvents need not be used, additional equipment for purifying used solvents and for controlling air pollution during solvent purification and use is not needed.

BACKGROUND ART

U.S. Pat. No. 3,923,636, Mead et al., Dec. 2, 1975, discloses the preparation of lube oils of improved viscosity index by hydrocracking a heavy oil charge stock. The aromatics are recovered from a heavy cut by solvent extraction; an optional solvent dewaxing step is disclosed.

U.S. Pat. No. 4,162,962, Stangeland, July 31, 1979, discloses a sequential hydrocracking and hydrogenation process for the production of UV stable lube oils.

U.S. Pat. No. 3,962,071, Ito et al., June 8, 1976, discloses a process for producing lubricating oils of greater stability by hydrogenating the lubricating oil fraction of a hydrocrackate in the presence of a palladium catalyst supported on a silica-containing refractory aluminum oxide carrier.

U.S. Pat. No. 3,876,522, Campbell et al., Apr. 8, 1975, discloses a process comprising hydrocracking an oil boiling above 650° F., fractionating the hydrocrackate into two lubricating oil fractions, and hydrogenating each of the two fractions.

U.S. Pat. Nos. 3,852,207, Stangeland et al., Dec. 3, 1974, 3,790,470, Mead et al., Feb. 5, 1974, and 3,666,657, Thompson et al., May 30, 1972, disclose improving the quality of hydrocracked oils by a subsequent hydrogenation step.

U.S. Pat. No. 4,181,598, Gillespie et al., Jan. 1, 1980, discloses the preparation of a lube base stock oil of improved pour point and stability from waxy crude oil fractions by solvent refining, catalytic dewaxing over a ZSM-5 zeolite catalyst, and hydrotreating.

U.S. Pat. No. 4,181,597, Yan et al., Jan. 1, 1980, discloses a process for improving the photolytic and thermal stability of a hydrocracked stock to thermal and photolytic oxidation by chemical reaction of the oil with stabilizing agents, such as olefins, alcohols, esters, and alkylhalides.

U.S. Pat. No. 4,176,050, Chen et al., Nov. 27, 1979, discloses the preparation of lubricating oils from waxy distillate lubricating stocks by solvent refining followed by catalytic dewaxing.

U.S. Pat. No. 3,755,145, Argauer, Aug. 28, 1973, discloses a process for preparing low pour point lube oils by hydrocracking a lube oil stock using a catalyst mixture comprising a conventional cracking catalyst and ZSM-5.

U.S. Pat. No. Re. 28,398, Chen et al., Apr. 22, 1975, (of U.S. Pat. No. 3,700,585), discloses dewaxing petroleum charge stocks using ZSM-5-type zeolites.

U.S. Pat. No. 4,171,257, O'Rear et al., Oct. 13, 1979, discloses the preparation of olefins from hydrocarbons using a low pressure ZSM-5 reactor and a low nitrogen feed.

FIGURE

The FIGURE illustrates the extreme sensitivity to nitrogen of intermediate pore size zeolites.

TECHNICAL DISCLOSURE

The discovery of the present invention is embodied in a process for producing stable lubricant oil stocks, comprising hydrocracking a hydrocarbonaceous feed to produce a hydrocrackate having a total nitrogen content of less than about 10 ppm by weight; dewaxing all or part of the portion of said hydrocrackate which boils above about 200° C. by contacting said hydrocrackate fraction with a dewaxing catalyst comprising an intermediate pore size zeolite; and stabilizing said dewaxed hydrocrackate by catalytic hydrofinishing.

The hydrocarbonaceous feeds from which lube oils are made usually contain aromatic compounds as well as normal and branched paraffins of very long chain lengths. These feeds usually boil in the gas oil range. Preferred feedstocks are vacuum gas oils with normal boiling ranges in the range of 350° C. to 590° C., and deasphalted residual oils having normal boiling ranges from about 480° C. to 650° C. Reduced topped crude oils, shale oils, liquified coal, coke distillates, flask or thermally cracked oils, atmospheric residua, and other heavy oils can also be used. In general, preferred feedstocks are hydrocarbonaceous mixtures boiling above 200° C. and are in the range of about 225° C. to 650° C.

The first step in the processing scheme is hydrocracking. In commercial operations, hydrocracking can take place as a single step process, or as a multi-step process using initial denitrification or desulfurization steps, all of which are well known. Where the hydrocarbon feedstock has a high nitrogen or sulfur content, it is preferable to have a pretreatment stage to remove some portion of the nitrogen or sulfur. With the pretreatment, the hydrocracking catalyst is able to operate more efficiently with a longer operating period than on high nitrogen or sulfur feeds. Normal hydrocracking processes will then substantially eliminate any residual sulfur or nitrogen.

Typically, hydrocracking process conditions include temperatures in the range of 250°-500° C., pressures in the range of 30 to 205 bar, or more, a hydrogen recycle rate of 100-1100 SCM/KL, and a LHSV (v/v/hr) of 0.1-50.

Catalysts employed in the hydrocracking zone or zones include those having hydrogenation-dehydrogenation activity, and active cracking supports. The support is often a refractory inorganic oxide such as silica-alumina, silica-alumina-zirconia and silica-alumina-titania composites, acid-treated clays, crystalline aluminosilicate zeolitic molecular sieves (such as Zeolite A, faujasite, Zeolite X and Zeolite Y), and combinations of the above.

Hydrogenation-dehydrogenation components of the hydrocracking catalyst usually comprise metals selected from Group VIII and Group VI-B of the Periodic Table, and compounds including them. Preferred Group VIII components include cobalt, nickel, platinum and palladium, particularly the oxides and sulfides of cobalt and nickel. Preferred Group VI-B components are the oxides and sulfides of molybdenum and tungsten. Thus, examples of hydrocracking catalysts which are preferred for use in the hydrocracking step are the combinations nickel-tungsten-silica-alumina and nickel-molybdenum-silica-alumina.

A particularly preferred hydrocracking catalyst for use in the present process is nickel sulfide/tungsten sulfide on a silica-alumina base which contains discrete metal phosphate particles (described in U.S. Pat. No. 3,493,517, incorporated herein by reference).

Hydrocracking catalysts can vary in their activities for hydrogenation and cracking and in their ability to sustain high activity during long periods of use depending upon their compositions and methods of preparation. There are any number of catalysts which are known to the art and which can be selected for use in the hydrocracking step based on operating conditions and feeds to optimize the hydrocracking operation.

The hydrocracking process step is performed to yield a hydrocrackate having a total nitrogen content of less than about 10 ppm (w/w). Standard hydrocracking procedures can easily achieve this nitrogen level, especially where the feed is subject to an initial partial denitrification process. Preferably, the nitrogen content of the hydrocrackate is as low as is consistent with economical refinery operations, but is preferably less than 5 ppm and more preferably less than about 1 ppm (w/w).

The hydrocracking step yields two significant benefits. First, by lowering the nitrogen content, it dramatically increases the efficiency and ease of the catalytic dewaxing step. Second, the viscosity index is greatly increased as the aromatic compounds present in the feed, especially the polycyclic aromatics, are opened and hydrogenated.

After the low nitrogen hydrocrackate has been formed, the catalytic dewaxing step and the hydrofinishing step can take place in either order, as neither process interferes with the benefits produced by the other. Preferably, the hydrofinishing step is last.

The hydrocrackate has a reduced nitrogen level, and therefore the intermediate pore size zeolites in the dewaxing catalyst achieve maximum activity in the dewaxing step. Intermediate pore size zeolite catalysts are extremely active and have high activity, even when operating upon feedstocks that have 800 ppm nitrogen or more. These zeolites, ZSM-5 is an example, have an extreme sensitivity to nitrogen: as the nitrogen content of a feed to a catalyst composite containing the zeolite decreases, the catalytic activity increases exponentially to an extremely high level. The great efficiency of the present invention comes in part from the combination of hydrocracking to produce a very low nitrogen, high viscosity index stock which is then extremely efficiently dewaxed to achieve a very low pour point. It can be appreciated that the higher the activity of the dewaxing catalyst, the lower the reactor temperature necessary to achieve a particular degree of dewaxing. A significant benefit is, therefore, the greater energy savings from using the enhanced efficiency catalyst. Additionally, since intermediate pore size zeolites are shape-selective, they crack the normal and slightly branched paraffins—components of the feedstock responsible for high pour points.

The intermediate pore size zeolites used in the dewaxing step are crystalline aluminosilicate zeolites having a silica to alumina mol ratio greater than about 10:1 and preferably greater than about 40:1. These zeolites can have useful dewaxing activity even at high silica:alumina mol ratios such as 200 to 500:1.

By "intermediate pore size" as used herein is meant an effective pore aperture in the range of about 5.3 to 6.9 Angstroms when the zeolite is in the H-form. Zeolites having pore apertures in this range tend to have unique molecular sieving characteristics. Unlike small pore zeolites such as erionite, they will allow hydrocarbons having some branching into the zeolitic void spaces. Unlike large pore zeolites such as the faujasites, they can differentiate between n-alkanes and slightly branched alkanes on the one hand and larger branched alkanes having, for example, quarternary carbon atoms.

The effective pore size of the zeolites can be measured using standard adsorption techniques and hydrocarbonaceous compounds of known minimum kinetic diameters. See Breck, *Zeolite Molecular Sieves*, 1974 (especially Chapter 8) and Anderson et al., J. Catalysis 58, 114 (1979), both of which are incorporated by reference.

Intermediate pore size zeolites in the H-form will typically admit molecules having kinetic diameters of 5 to 6 Angstroms with little hindrance. Examples of such compounds (and their kinetic diameters in Angstroms) are: n-hexane (4.3), 3-methylpentane (5.5), benzene (5.85), and toluene (5.8). Compounds having kinetic diameters of about 6 to 6.5 Angstroms can be admitted into the pores, depending on the particular zeolite, but do not penetrate as quickly and in some cases, are effectively excluded (for example, 2,2-dimethylbutane is excluded from H-ZSM-5). Compounds having kinetic diameters in the range of 6 to 6.5 Angstroms include: cyclohexane (6.0), 2,3-dimethylbutane (6.1), 2,2-dimethylbutane (6.2), m-xylene (6.1), and 1,2,3,4-tetramethylbenzene (6.4). Generally, compounds having kinetic diameters of greater than about 6.5 Angstroms cannot penetrate the pore apertures and thus cannot be adsorbed in the interior of the zeolite. Examples of such larger compounds include: o-xylene (6.8), hexamethylbenzene (7.1), 1,3,5-trimethylbenzene (7.5), and tributylamine (8.1).

The preferred effective pore size range is from about 5 to about 6 Angstroms. ZSM-5, for example, falls within this range.

In performing adsorption measurements to determine pore size, standard techniques are used. It is convenient to consider a particular molecule as excluded if it does not reach at least 95% of its equilibrium adsorption value on the zeolite in less than about 10 minutes (p/po=0.5; 25° C.).

It is particularly preferred that the silica:alumina mol ratio of the intermediate pore size zeolite be greater than about 200:1. With such a zeolite, olefins can be produced during the dewaxing step, surprisingly even in the presence of hydrogen and at high pressures. As the desired operating pressure in the dewaxing step is increased, the silica:alumina mol ratio must also be increased if olefin production is desired. For example, to catalytically dewax and yet produce olefins at a pressure of greater than about 135 bar, the silica:alumina mol ratio should be greater than about 1000:1.

Examples of intermediate pore size zeolites include the new zeolite CZH-5 and members of the ZSM series such as ZSM-5, ZSM-11, ZSM-12, ZSM-21, ZSM-23, ZSM-35, and ZSM-38.

ZSM-5 is described in U.S. Pat. Nos. 3,702,886 and 3,770,614; ZSM-11 is described in U.S. Pat. No. 3,709,979; ZSM-12 is described in U.S. Pat. No. 3,832,449; and ZSM-21 is described in U.S. Pat. No. 3,948,758. These patents are incorporated herein by reference. The preferred zeolites are ZSM-5 and CZH-5.

The CZH-5 zeolites have a mol ratio of an oxide selected from silicon oxide, germanium oxide, and mixtures thereof to an oxide selected from aluminum oxide, gallium oxide, and mixtures thereof greater than about 5:1 and have the X-ray diffraction lines of Table I. The zeolite further has a composition, as synthesized and in the anhydrous state, in terms of mol ratios of oxides as follows: (0.5 to 1.4)$R_2O$:(0 to 0.50)$M_2O$:$W_2O_3$:(greater than 5)$YO_2$ wherein M is an alkali metal cation, W is selected from aluminum, gallium, and mixtures thereof, Y is selected from silicon, germanium and mixtures thereof, and R is a cation derived from a choline-type compound. CZH-5 zeolites can have a $YO_2$:$W_2O_3$ mol ratio greater than about 5:1, preferably greater than about 40:1. The range of $YO_2$:$W_2O_3$ mol ratios is preferably from about 8:1 to 150:1, more preferably from about 10:1 to 100:1, and most preferably from about 40:1 to about 100:1. Preferably, CZH-5 is an aluminosilicate wherein W is aluminum and Y is silicon.

The method for preparing CZH-5 zeolites comprises preparing an aqueous mixture containing sources of an organic nitrogen-containing compound, an oxide selected from aluminum oxide, gallium oxide, and mixtures thereof, and an oxide selected from silicon oxide, germanium oxide, and mixtures thereof, and having a composition, in terms of mol ratios of oxides, falling within the following ranges: $YO_2/W_2O_3$, 5:1 to 350:1; $R_2O/W_2O_3$ 0.5:1 to 40:1; wherein Y is selected from silicon, germanium, and mixtures thereof, W is selected from aluminum, gallium and mixtures thereof, and R is a cation derived from a choline-type compound; maintaining the mixture at a temperature of at least 100° C. until the crystals of said zeolite are formed; and recovering said crystals.

CZH-5 zeolites have a crystalline structure whose X-ray powder diffraction pattern shows the following characteristic lines:

TABLE I

| d(A) | Intensity |
| --- | --- |
| 11.85 ± 0.10 | S |
| 11.60 ± 0.10 | M |
| 9.97 ± 0.05 | M |
| 4.25 ± 0.02 | VS |
| 3.87 ± 0.01 | M |
| 3.83 ± 0.01 | M |
| 3.46 ± 0.01 | M |

A typical CZH-5 aluminosilicate zeolite has the X-ray diffraction pattern of Table II.

TABLE II

| 2θ | d(A) | I/I$_o$ |
| --- | --- | --- |
| 7.46 | 11.85 | 50 |
| 7.63 | 11.60 | 30 |
| 8.87 | 9.97 | 25 |
| 14.78 | 5.99 | 3 |
| 15.25 | 5.81 | 4 |
| 18.74 | 4.73 | 14 |
| 18.95 | 4.68 | 5 |
| 19.15 | 4.63 | 8 |
| 20.06 | 4.43 | 5 |
| 20.92 | 4.37 | 3 |
| 21.32 | 4.25 | 100 |
| 21.77 | 4.08 | 14 |
| 21.87 | 4.06 | 7 |
| 21.98 | 4.04 | 15 |
| 22.47 | 3.96 | 6 |
| 22.96 | 3.87 | 37 |
| 23.19 | 3.83 | 28 |
| 23.83 | 3.73 | 3 |
| 24.47 | 3.64 | 3 |

TABLE II-continued

| 2θ | d(A) | I/I₀ |
|---|---|---|
| 25.19 | 3.54 | 6 |
| 25.77 | 3.46 | 16 |
| 26.30 | 3.39 | 11 |
| 26.80 | 3.33 | 13 |
| 26.94 | 3.31 | 5 |
| 27.98 | 3.19 | 7 |
| 28.84 | 3.14 | 3 |
| 29.30 | 3.05 | 5 |
| 30.75 | 2.91 | 3 |
| 30.93 | 2.89 | 6 |

These values were determined by standard techniques. The radiation was the K-alpha/doublet of copper and a scintillation counter spectrometer with a strip-chart pen recorder was used. The peak heights I and the positions, as a function of $2\theta$ where $\theta$ is the Bragg angle, were read from the spectrometer chart. From these measured values, the relative intensities, $100I/I_0$, where $I_0$ is the intensity of the strongest line or peak, and d, the interplanar spacing in Angstroms corresonding to the recorded lines, were calculated. The X-ray diffraction pattern of Table I is characteristic of all species of CZH-5 family compositions. The zeolite produced by exchanging the metal or other cations present in the zeolite with various other cations yields substantially the same diffraction pattern although there can be minor shifts in interplanar spacing and variations in relative intensity. Minor variations in the diffraction pattern can also result from variations in the choline-type compound used in the preparation and from variations in the silica-to-alumina mol ratio of a particular sample. Calcination can also cause minor shifts in the X-ray diffraction pattern. Notwithstanding these minor perturbations, the basic crystal lattice structure remains unchanged.

CZH-5 zeolites can be suitably prepared from an aqueous solution containing sources of an alkali metal oxide, a choline-type compound, an oxide of aluminum or gallium, or mixture of the two, and an oxide of silicon or germanium, or mixture of the two. The reaction mixture should have a composition in terms of mol ratios of oxides falling within the following ranges:

| | Broad | Preferred |
|---|---|---|
| YO₂/W₂O₃ | 5-350 | -200 |
| M₂O/W₂O₃ | 0.5-20 | 1-17 |
| R₂O/W₂O₃ | 0.5-40 | 5-25 |
| MCl/W₂O₃ | 20-200 | 50-150 |
| H₂O/W₂O₃ | 500-20000 | 1500-15000 | wherein R is as disclosed above, Y is silicon, germanium or both, and W is aluminum, gallium or both. M is an alkali metal, preferably sodium. Typically, an alkali metal hydroxide or alkali metal halide is used in the reaction mixture; however, these components can be omitted so long as the equivalent basicity is maintained. The choline-type compound can provide hydroxide ion.

By "choline-type compound" is meant an organic nitrogen compound having the formula $R^1R^2R^3NR^4OH-X$. $R^1$, $R^2$ and $R^3$ are $C_1$ to $C_4$ lower alkyl; $R^4$ is $C_1$ to $C_5$ alkyl and X is an anion. The choline-type compounds are generally trialkyl (2-hydroxyalkyl-)ammonium compounds. The preferred choline-type compound has the choline (or trimethyl(2-hydroxyethyl)ammonium) cation. The choline-type compound can be in the form of the hydroxide, e.g., choline hydroxide, the halide, e.g., choline chloride, bromide, or fluoride, or it can be associated with other suitable anions such as sulfates, acetates, and nitrates. The reaction mixture which allows the synthesis of CZH-5 is typically prepared by the addition to water of choline chloride, choline fluoride, choline hydroxide, or mixtures of these and other choline-type compounds.

The reaction mixture is prepared using standard zeolitic preparation techniques. Typical sources of aluminum oxide for the reaction mixture include aluminates, alumina, and aluminium compounds such as $AlCl_3$ and $Al_2(SO_4)_3$. Typical sources of silicon oxide include silicates, silica hydrogel, silicic acid, colloidal silica, and silica hydroxides. Gallium and germanium can be added in forms corresponding to their aluminum and silicon counterparts.

Salts, particularly alkali metal halides such as sodium chloride, can be added to or formed in the reaction mixture. They facilitate the crystallization of the zeolite and prevent silica occlusion in the lattice, as disclosed in U.S. Pat. No. 3,849,463, Dwyer et al., Nov. 19, 1974, incorporated herein by reference.

The reaction mixture is maintained at an elevated temperature until the crystals of the zeolite are formed. The temperature during the hydrothermal crystallization step are typically maintained at a temperature of from about 100° C. to about 235° C., preferably from about 120° C. to about 200° C. and most preferably from about 135° C. to about 165° C. The crystallization period is typically greater than 3 days and preferably from about 7 days to about 50 days.

The hydrothermal crystallization is conducted under pressure and usually in an autoclave so that the reaction mixture is subject to autogenous pressure. Although the reaction mixture can be stirred during crystallization, preferably it is not.

Once the zeolite crystals have formed, the solid product is separated from the reaction mixture by standard mechanical separation techniques such as filtration. The crystals are water-washed and then dried, e.g., at 90°-150° C. for from 8 to 24 hours, to obtain the as synthesized, CZH-5 zeolite crystals. The drying step can be performed at atmospheric or subatmospheric pressures.

During the hydrothermal crystallization step, the CZH-5 crystals can be allowed to nucleate spontaneously from the reaction mixture. The reaction mixture can also be seeded with CZH-5 crystals both to direct, and accelerate the crystallization, as well as to minimize the formation of undesired aluminosilicate contaminants. If the reaction mixture is seeded with CZH-5 crystals, the concentration of the choline-type organic nitrogen compound can be greatly reduced or eliminated, but it is preferred to have some organic compound present, e.g., an alcohol.

The synthetic CZH-5 zeolites can be used as synthesized or can be thermally treated (calcined). Usually, it is desirable to remove the alkali metal cation by ion exchange and replace it with hydrogen, ammonium, or any desired metal ion. The zeolite can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired. Typical replacing cations can include metal cations, e.g., rare earth, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, Fe and Co are particularly preferred.

The hydrogen, ammonium, and metal components can be exchanged into the zeolite. The zeolite can also be impregnated with the metals, or, the metals can be physically intimately admixed with the zeolite using standard methods known to the art. And, the metals can be occluded in the crystal lattice by having the desired metals present as ions in the reaction mixture from which the CZH-5 zeolite is prepared.

Typical ion exchange techniques involve contacting the synthetic zeolite with a solution containing a salt of the desired replacing cation or cations. Although a wide variety of salts can be employed, chlorides and other halides, nitrates, and sulfates are particularly preferred. Representative ion-exchange techniques are disclosed in a wide variety of patents including U.S. Pat. Nos. 3,140,249; 3,140,251; and 3,140,253. Ion-exchange can take place either before or after the zeolite is calcined.

Following contact with the salt solution of the desired replacing cation, the zeolite is typically washed with water and dried at a temperature ranging from 65° C. to about 315° C. After washing, the zeolite can be calcined in air or inert gas at temperatures ranging from about 200° C. to 820° C. for periods of time ranging from 1 to 48 hours, or more, to produce a catalytically-active product especially useful in hydrocarbon conversion processes.

Regardless of the cations present in the synthesized form of the zeolite, the spatial arrangement of the atoms which form the basic crystal lattice of the zeolite remains essentially unchanged. The exchange of cations has little, if any, effect on the zeolite lattice structures.

The CZH-5 aluminosilicate can be manufactured into a wide variety of physical forms. Generally speaking, the zeolite can be in the form of a powder, a granule, or a molded product, such as extrudate having particle size sufficient to pass through a 2-mesh (Tyler) screen and be retained on a 400-mesh (Tyler) screen. In cases where the catalyst is molded, such as by extrusion with an organic binder, the aluminosilicate can be extruded before drying, or, dried or partially dried and then extruded.

The zeolite can be composited with other materials resistant to the temperatures and other conditions employed in organic conversion processes. Such matrix materials include active and inactive materials and synthetic or naturally occurring zeolites as well as inorganic materials such as clays, silica and metal oxides. The latter may be either naturally occurring or in the form of gelatinous precipitates, sols or gels including mixtures of silica and metal oxides. Use of a material in conjunction with the synthetic zeolite, i.e., combined therewith, which is active, tends to improve the conversion and selectivity of the catalyst in certain organic conversion processes. Inactive materials suitably serve as diluents to control the amount of conversion in a given process so that products can be obtained economically without employing other means for controlling the rate of reaction. Frequently, zeolite materials have been incorporated into naturally occurring clays, e.g., bentonite and kaolin. These materials, i.e., clays, oxides, etc., function, in part, as binders for the catalyst. It is desirable to provide a catalyst having good crush strength, because in petroleum refining the catalyst is often subjected to rough handling. This tends to break the catalyst down into powder-like materials which cause problems in processing.

Naturally occurring clays which can be composited with the synthetic zeolites of this invention include the montmorillonite and kaolin families, which families include the sub-bentonites, and the kaolins commonly known as Dixie, McNamee, Georgia and Florida clays or others in which the main mineral constituent is halloysite, kaolinite, dickite, nacrite, or anauxite. Fibrous clays such as sepiolite and attapulgite can also be used as supports. Such clays can be used in the raw state as originally mined or initially subjected to calcination, acid treatment or chemical modification.

In addition to the foregoing materials, the CZH-5 zeolites can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-zirconia, silica-alumina-magnesia and silica-magnesia-zirconia. The matrix can be in the form of a cogel.

The CZH-5 zeolites can also be composited with other zeolites such as synthetic and natural faujasites (e.g., X and Y), erionites, and mordenites. They can also be composited with purely synthetic zeolites such as those of the ZSM series. The combination of zeolites can also be composited in a porous inorganic matrix.

The relative proportions of the crystalline aluminosilicate zeolite of this invention and inorganic oxide gel matrix can vary widely. The CZH-5 content can range from about 1 to about 90 percent by weight but is more usually in the range of about 2 to about 50 percent by weight of the composite.

The following examples illustrate the preparation of CZH-5 through hydrothermal crystallization.

EXAMPLE 1

In a 500 ml Teflon bottle 0.2902 grams of sodium aluminate (48% $Al_2O_3$, 33% $Na_2O$) 12.46 grams choline chloride and 50 grams of water were mixed. To this mixture was added a second solution prepared by dissolving 6.65 grams sodium chloride in 100 grams of distilled water.

To the solutions so prepared, a third solution comprising N-sodium silicate solution (28% $SiO_2$), 46.34 grams, in 150 grams distilled water was added. The final reaction mixture was obtained by adding a hydrochloric acid solution prepared by the mixture of 2.68 grams of concentrated HCl (36% HCl) in 71.88 grams distilled water.

The Teflon reaction bottle was sealed and the reaction mixture was autoclaved in an oven at 150° C. for 15 days until the crystalline precipitate was formed.

The crystals were allowed to settle, the clear supernatant liquid was decanted and the crystals were filtered, washed with distilled water to remove chloride ions and dried for 16 hours at 120° C. and 20 inches of vacuum under nitrogen. The X-ray diffraction pattern of the product was taken and was found to be that of Table III which is characteristic of CZH-5.

TABLE III

| d(A) | Intensity |
|---|---|
| 11.79 | S |
| 11.56 | M |
| 9.94 | M |
| 5.97 | W |

TABLE III-continued

| d(A) | Intensity |
|---|---|
| 5.79 | W |
| 4.72 | W |
| 4.67 | W |
| 4.62 | W |
| 4.42 | W |
| 4.24 | VS |
| 4.07 | VS |
| 4.04 | S |
| 3.96 | W |
| 3.87 | M |
| 3.82 | M |
| 3.72 | W |
| 3.63 | W |
| 3.53 | W |
| 3.45 | M |
| 3.38 | W |
| 3.32 | W |
| 3.18 | W |
| 3.13 | W |
| 3.04 | W |
| 2.91 | W |
| 2.88 | W |

EXAMPLE 2

In a 500 ml Teflon bottle 0.5743 grams of sodium aluminate (48% $Al_2O_3$, 33% $Na_2O$) 12.33 grams choline chloride and 50 grams of water were mixed. To this mixture was added a second solution prepared by dissolving 6.54 grams sodium chloride in 100 grams of distilled water.

To the solution so prepared, a third solution comprising N-sodium silicate solution (28% $SiO_2$), 45.86 grams, in 150 grams distilled water was added. The final reaction mixture was obtained by adding a hydrochloric acid solution prepared by the mixture of 2.96 grams of concentrated HCl (36% HCl) in 72.0 grams distilled water.

The Teflon reaction bottle was sealed and the reaction mixture was autoclaved in an oven at 150° C. for 15 days until the crystalline precipitate was formed.

The crystals were allowed to settle, the clear supernatant liquid was decanted and the crystals were filtered, washed with distilled water to remove chloride ions and dried for 16 hours at 120° C. and 20 inches of vacuum under nitrogen. The X-ray diffraction pattern of the product was taken and was found to be that of Table IV, typical of the CZH-5 zeolite.

TABLE IV

| d(A) | Intensity |
|---|---|
| 11.79 | S |
| 11.56 | M |
| 9.94 | M |
| 5.97 | W |
| 5.79 | W |
| 4.72 | M-W |
| 4.67 | W |
| 4.62 | W |
| 4.42 | W |
| 4.24 | S |
| 4.07 | M |
| 4.04 | M |
| 3.96 | W |
| 3.87 | S |
| 3.82 | S |
| 3.72 | W |
| 3.63 | W |
| 3.53 | W |
| 3.45 | M |
| 3.38 | M |
| 3.32 | M |
| 3.18 | W |
| 3.13 | W |
| 3.04 | W |
| 2.91 | W |
| 2.88 | W |

EXAMPLES 3-7

Examples 3-7 illustrate the preparation of CZH-5 and the effect of the length of time the reaction mixture is maintained at elevated temperature and autogenous pressure on the formation of the zeolite crystals.

The reaction mixtures for Examples 3-7 were prepared to have the following mol ratios of ingredients:

| | | |
|---|---|---|
| $SiO_2/Al_2O_3$ | 80:1 | |
| $R_2O/Al_2O_3$ | 16:1 | (R = choline) |
| $Na_2O/Al_2O_3$ | 4.0:1 | |
| $H_2O/Al_2O_3$ | 8328:1 | |
| $NaCl/Al_2O_3$ | 84:1 | |
| wt% $Al_2O_3$ and $SiO_2$ | 3 | |
| wt% NaCl | 3 | |

For each of the experiments of Examples 3 to 7 the reaction mixture was maintained at 150° C. under autogenous pressure without stirring during crystallization.

Table V presents the crystallization time and the results of the analysis of the products produced.

TABLE V

| Example | 3 | 4 | 5 | 6 | 7 |
|---|---|---|---|---|---|
| Crystallization Time (days) | 3 | 7 | 13 | 15 | 16 |
| Prod. Analyses: Structure (XRD) | amor | 50%CZH-5 | 75%CZH-5 | 100%CZH-5 | 100%CZH-5 |
| Composition | | | | | |
| LOI* | 6.68 | 8.05 | 3.03 | 4.33 | 8.96 |
| $SiO_2/Al_2O_3$ | 37.5 | 42.5 | 53.7 | 64.2 | 54.2 |
| $R_2O/Al_2O_3$ | 1.02 | 1.08 | 1.33 | 1.38 | 1.33 |
| $Na_2O/Al_2O_3$ | .28 | .23 | .17 | .20 | .23 |

*loss on ignition - 540° C., 10 hours, in air.

The intermediate pore size zeolite may be in the hydrogen form, or in a metal cation or cation complex form which possesses little or no hydrogenation activity, for example, with calcium, strontium, barium, zinc, copper, silver or rare earth metal. The hydrogen form is preferred. Hydrogenation activity of a catalyst is the capability of the catalyst to adsorb and dissociate molecular hydrogen.

The hydrogen and other forms of the zeolite may be obtained by conventional base and ion-exchange methods routinely employed in the zeolite art, including customary drying and calcining steps. Preferably the zeolite herein has a low sodium content, less than 1 percent by weight, more preferably less than about 100 ppm by weight. Intermediate pore size zeolites having larger sodium contents can exhibit a useful catalytic activity for dewaxing but are not preferred.

The zeolite can be in any convenient form as required for ordinary fixed-bed, fluid-bed or slurry use. The catalyst can be composited with binders or it can be tableted without binders. Preferably it is used in a fixed-bed reactor and in a composite with a porous inorganic binder or matrix in such porportions that the resulting product contains from 1% to 95% by weight, and preferably from 10% to 70% by weight, of the zeolite in the final composite. It is desirable that the porous inorganic binder or matrix (and the zeolite) have substantially no hydrocarbon cracking activity.

The term "porous matrix" includes inorganic compositions with which a zeolite can be combined, dispersed, or otherwise intimately admixed. The matrix can be catalytically active in a hydrocarbon cracking sense but is preferably inactive. The porosity of the matrix can either be inherent in the particular material or it can be caused by mechanical or chemical means. Representative matrices include pumice, firebrick, diatomaceous earths, and inorganic oxides. Representative inorganic oxides include alumina, silica, amorphous silica-alumina mixtures, naturally occurring and conventionally processed clays, for example, bentonite, kaolin, sepiolite, halloysite, and attapulgite, as well as other siliceous oxide mixtures such as silica-magnesia, silica-zirconia, and silica-titania.

The preferred inorganic matrices are those having low acidity—hence low hydrocarbon cracking activity. For example, unmixed metal oxides, such as alumina, silica, zirconia, titania, or magnesia rather than mixtures of oxides. Where mixtures of oxides are used, there is a greater tendency for the matrix to itself have sufficient hydrocarbon cracking activity to cause substantial and undesirable increases in the coking rates, thereby losing a significant advantage for refinery operations.

The compositing of the zeolite with an inorganic oxide matrix can be achieved by any suitable method wherein the zeolite is intimately admixed with the oxide while it is in a hydrous state, for example, as a hydrosol, hydrogel, wet gelatinous precipitate, or in a dried state, or in combinations. A convenient method is to prepare a hydrous mono or plural oxide gel or cogel using an aqueous solution of a salt or mixture of salts, for example, aluminum sulfate and sodium silicate. To this solution is added ammonium hydroxide, carbonate, etc., in an amount sufficient to precipitate the oxides in hydrous form. After washing the precipitate to remove at most of any water-soluble salt present in the precipitate, the zeolite in finely divided state is thoroughly admixed with the precipitate together with added water or lubricating agent sufficient in amount to facilitate shaping of the mix, e.g., by extrusion.

Typical dewaxing conditions include a LHSV (V/V/hr) of 0.5–200, a temperature from about 260° C. to 610° C. and a pressure from below atmospheric to several hundred bar. Preferably, where the silica:alumina mol ratio of the zeolite is less than about 200:1, the pressure is less than about 14 bar and the temperature from about 260° C. to about 430° C. With pressures and temperatures within the preferred range and especially with no hydrogen present, significant amounts of olefins are produced during dewaxing and can be recovered from further processing.

Where the feed to the dewaxing step has a wide boiling range, it is especially preferred to separate it into at least two fractions, where each fraction boils over a range of at least about 50° C. When a wide boiling range feed is catalytically dewaxed, the higher boiling portions tend to be underdewaxed while the lower boiling portions tend to be overdewaxed. By splitting the feed to the dewaxing step, the different boiling range fractions can be dewaxed at different severities. After dewaxing, the separate streams can be recombined or processed separately.

The hydrofinishing step can be performed either before or after the dewaxing step. Hydrofinishing is typically conducted at temperatures ranging from about 190° to about 340° C. at pressures from about 25 to about 210 bar at space velocities (LHSV) between about 0.1 and 20. The hydrogenation catalyst employed must be active enough not only to hydrogenate the olefins, diolefins and color bodies within the lube oil fractions, but also to reduce the aromatic content to a value of below about 10% by weight. The hydrofinishing step is critical in preparing an acceptably stable lubricating oil since lubricant oils prepared from hydrocracked stocks are notoriously unstable to air and light and tend to form sludges spontaneously and quickly.

Suitable hydrogenation catalysts include conventional metallic hydrogenation catalysts, particularly the Group VIII metals such as cobalt, nickel, palladium, and platinum. The metal is typically associated with carriers such as bauxite, alumina, silica gel, silica-alumina composites, and crystalline aluminosilicate zeolites. Nickel is a particularly preferred hydrogenation catalyst. If desired, Group VIII metals can be used with molybdates. Metal oxides or sulfides can be used. However, sulfided forms of these metals are not particularly suitable for use in accordance with the present invention.

The following examples illustrate the invention.

EXAMPLE 8

A test was conducted to show the extreme nitrogen sensitivity of ZSM-5. The feed was Arabian Light gas oil having the following characteristics:

| | |
|---|---|
| Gravity °API | 35.4 |
| Sulfur ppm | 33 |
| N, ppm | 7 |
| Pour point °C. | 30 |
| Paraffin/naphthenes aromatic | 44/39/17 |
| Distillation °C. | |
| 5/30 | 392/415 |
| 50/70 | 428/455 |
| 90/EP | 486/523 |

The gas oil was hydrocracked to 16% boiling less than 600° F. at an LHSV of 2.2, 600 psig, and 10,000 SCF/B hydrogen using a standard nickel-tungsten cracking catalyst. The nitrogen level was varied by doping the feed with n-butylamine. The results, shown in FIG. 1, illustrate the sensitivity of ZSM-5 to nitrogen content especially at low levels. Dropping the nitrogen content of the feed from 20 ppm to 2 ppm increases the catalytic activity by 25° C. from 326° C. to 300° C.

EXAMPLE 9

A straight-run vacuum gas oil having the following characteristics was hydrocracked using a (one) stage process and a conventional catalyst:

| | |
|---|---|
| °API | 20.7 |
| Aniline Pt. | 75° C. |
| Sulfur | 1.04% |
| Nitrogen | 1700 ppm |
| ASTM D1160, °C. | |
| ST/5 | 360/390 |
| 10/30 | 400/418 |
| 50 | 431 |
| 70/90 | 450/499 |
| 95/EP | 514/538 |
| Rec., LV% | 99.0 |
| Viscosity Index = | 35 (after dewaxing) |

The 370° C.+ fraction was recovered. This fraction had the following characteristics:

| | |
|---|---|
| °API | 34.0 |
| Pour point | 32° C. |
| Viscosity Index | 128 |
| UV Aging Life | 1 hr |
| Sulfur ppm | 11 |
| N, ppm | 0.47 |
| Distillation, °C. (D1160) | |
| Start/5 | 351/381 |
| 10/30 | 388/403 |
| 50 | 419 |
| 70/90 | 444/490 |
| 95/EP | 507/522 |

This vacuum gas oil was then sequentially catalytically dewaxed and hydrofinished. Dewaxing and hydrofinishing took place in a two-reactor system. The first reactor contained a dewaxing catalyst and was one-third of the overall catalyst volume. The second reactor contained a hydrofinishing catalyst and was two-thirds of the overall catalyst volume. The dewaxing catalyst was 65% ZSM-5 composited in Al$_2$O$_3$. The hydrofinishing catalyst was 0.4% palladium on an amorphous aluminosilicate. Feed flowed first over the dewaxing catalyst. The entire effluent from the dewaxing reactor then flowed over the hydrofinishing catalyst. The overall processing conditions included 2600 psig (total); LHSV 0.67; 2500 SCF/B H$_2$. The dewaxing layer was maintained at 288° C. and the hydrofinishing bed was maintained at 260° C. The lube oil stock had the following characteristics:

| | |
|---|---|
| °API | 32.7 |
| Pour point | −23° C. |
| Viscosity Index | 91 |
| UV Aging Life | 20+hr |
| Distillation °C. | |
| 5/10 | 346/359 |
| 30/50 | 386/402 |
| 70/90 | 420/456 |
| 95/EP | 482/536 |

The UV stability of the lube oil was measured by placing the oil samples in glass bottles 16 mm in diameter, 50 mm high and having a wall thickness of about 1 mm. The caps were loosened and the bottles were placed in a circular rack surrounding a 450-watt cylindrical Hanovia Mercury vapor lamp (product of Conrad Precision Industries, Inc.) mounted in a vertical position. The distance along a line perpendicular to the longitudinal axis of the lamp extending from the longitudinal axis of the lamp to the longitudinal axis of the bottle was 2½ inches. The sample was observed over a period of time. At the first appearance of a light fine floc (small particles suspended in the oil), the time to formation of the floc was noted. The additional time until a moderate floc or heavy floc was also noted. In some cases of poor stability, a ring of precipitated particles can be observed during the test clinging to the walls of the bottle.

EXAMPLE 10

The hydrocracked oil of Example 9 was dewaxed and hydrofinished using the same catalysts and conditions except the temperature of the dewaxing layer was maintained at 283° C. instead of 288° C.

The product had the following characteristics:

| | |
|---|---|
| °API | 33.4 |
| Pour point | −4° C. |
| Viscosity Index | 109 |
| Distillation °C. | |
| 5/10 | 354/370 |
| 30/50 | 397/414 |
| 70/90 | 433/471 |
| 95 | 493 |

Examples 9 and 10 illustrate the dramatic decrease in pour point and increase in viscosity index as well as the very high oxidative stability of the lube oil stock obtained using the present process. The comparisons also illustrate the extreme activity of the ZSM-5 catalyst when operating on a low nitrogen hydrocracked stock. A 5° C. change in dewaxing layer temperature caused a pour point change of 19° C. and a viscosity index change of 19. The UV aging test life increased from 1 hour for the feed to over 20 hours for the product.

For commercial operations, the amount of dewaxing can be controlled by temperature control of the reactor, varying the amount of the intermediate pore size zeolite in the dewaxing zone, or by precoking or poisoning treatments.

What is claimed is:

1. A process for preparing stable lubricant oil stocks, comprising:
    (a) hydrocracking a hydrocarbonaceous feed to produce a hydrocrackate wherein the portion of said hydrocrackate which boils above about 200° C. has a total nitrogen content of less than 10 ppm by weight;
    (b) stabilizing at least part of said hydrocrackate portion by catalytic hydrofinishing; and
    (c) dewaxing all or part of the portion of said stabilized hydrocrackate which boils above about 200° C. by contacting said stabilized hydrocrackate fraction with a dewaxing catalyst comprising an intermediate pore size zeolite.

2. A process for preparing stable lubricant oil stocks, comprising:
    (a) hydrocracking a hydrocarbonaceous feed to produce a hydrocrackate wherein the portion of said hydrocrackate which boils above about 200° C. has a total nitrogen content of less than about 10 ppm by weight;
    (b) dewaxing all or part of said portion of said hydrocrackate which boils above about 200° C. by contacting said hydrocrackate fraction with a dewaxing catalyst comprising an intermediate pore size zeolite; and
    (c) stabilizing at least part of said dewaxed hydrocrackate portion by catalytic hydrofinishing.

3. A process according to claim 2 wherein said hydrocrackate has a total nitrogen content of less than about 5 ppm by weight.

4. A process according to claim 3 wherein said total nitrogen content is less than about 1 ppm by weight.

5. A process according to claim 2 wherein said intermediate pore size zeolite is selected from ZSM-5 and ZSM-11.

6. A process according to claim 2 wherein said intermediate pore size zeolite has a silica:alumina mol ratio greater than about 200:1.

7. A process according to claim 5 wherein said dewaxing catalyst further comprises an inorganic oxide matrix substantially free of hydrocracking activity and wherein said dewaxing catalyst is substantially free of hydrogenation components.

8. A process according to claim 7 wherein said dewaxing occurs at a pressure of less than about 14 bar.

9. A process according to claim 2 wherein said hydrocrackate portion is separated into at least two fractions wherein each fraction boils over a range of at least about 50° C. and wherein said fractions are dewaxed at different severities.

10. A process according to claim 9 wherein at least the lower boiling of said fractions boils over a range of less than about 100° C.

11. A process according to claim 2 or 6 further comprising separating olefins from said dewaxed hydrocrackate portion before stabilizing said dewaxed hydrocrackate portion.

12. A process according to claim 1 or 2 wherein said dewaxing process is conducted after removing substantially all hydrogen from the portion of said hydrocrackate boiling above about 200° C.

* * * * *